said cam means, whereby said cutting means are swingably operated by said driving means, and timed cooperation of said thread holders and said cutting means is assured.

20. In a high capacity machine for weaving, a stationary structure, driving means supported by said structure and connected to and driving said machine, movable thread holders located adjacent to the fabric edge and comprising a jaw member, said driving means comprising cam means, said jaw member having an extension which is movably connected with said stationary structure and with said cam means and is swingably moved by said cam means, another jaw member slidably connected with said first mentioned jaw member, and guide means connected with said stationary structure and adapted to engage said other jaw member and to thereby move said other jaw member relatively to said first mentioned jaw member when said first mentioned jaw member is moved by said cam means.

21. In a high capacity machine for weaving, a stationary structure, driving means supported by said structure and connected to and driving said machine, movable thread holders located adjacent to the fabric edge and comprising a jaw member, said driving means comprising cam means, said jaw member having an extension which is movably connected with said stationary structure and with said cam means and is swingably moved by said cam means, another jaw member slidably associated with said first mentioned jaw member, guide means connected with said stationary structure and adapted to engage said other jaw member and to thereby move said other jaw member relatively to said first mentioned jaw member when said first mentioned jaw member is moved by said cam means, and resilient means interconnecting both of said jaw members and effecting cooperation of both of said jaw members and engagement of said other jaw member and said guide means.

22. In a high capacity loom for weaving, healds, a slay, shuttles, picking means for picking said shuttles across the loom, receiving means for receiving said shuttles, a conveyor belt for transporting said shuttles from said receiving means back to said picking means, release means connected with said receiving means and adapted to release said shuttles from said receiving means and letting said shuttles drop on to said conveyor belt, elevator means for moving said shuttles from said conveyor belt into said picking means, thread gripping means connected with said shuttles, thread feeding and closing means for feeding thread into and closing said thread gripping means, opening means for opening said thread gripping means and releasing the thread, thread holding means adjacent to the fabric edge for holding the thread, thread cutting means adjacent to the fabric edge for cutting the thread, bending-in means adjacent to the fabric edge for bending in the ends of the cut threads and for forming a selvage, fabric-stretching means adjacent to the fabric edge for stretching the fabric, a common driving means operatively connected with and driving said healds, and said slay, and said conveyor belt, and said release means, and said elevator means, and said thread feeding and closing means, and said opening means, and said thread holding means, and said cutting means, and said bending-in means, and said fabric-stretching means and being operatively connected with and controlling the operation of said picking means.

23. In a high capacity loom for weaving, healds, a slay, shuttles, picking means for picking said shuttles across the loom, receiving means for receiving said shuttles, a conveyor belt for transporting said shuttles from said receiving means back to said picking means, release means connected with said receiving means and adapted to release said shuttles from said receiving means and to let said shuttles drop on to said conveyor belt, elevator means for moving said shuttles from said conveyor belt into said picking means, thread gripping means connected with said shuttles, thread feeding and closing means for feeding thread into and closing said thread gripping means, opening means for opening said thread gripping means and releasing the thread, thread holding means adjacent to the fabric edge for holding the thread, thread cutting means adjacent to the fabric edge for cutting the thread, bending-in means adjacent to the fabric edge for bending in the ends of the cut threads and for forming a selvage, fabric stretching means adjacent to the fabric edge for stretching the fabric, a common driving means operatively connected to and driving said healds and said slay and said conveyor belt and said release means and said elevator means and said thread feeding and closing means and said opening means and said thread holding means and said cutting means and said binding-in means and said fabric stretching means and being operatively connected with and controlling the operation of said picking means, and a source of power separate from said common driving means and being connected with and driving said picking means.

24. In a high capacity machine for weaving having gripping shuttles, the combination of ejecting means adapted to eject said shuttles in a direction across the shed, receiving means adapted to receive said shuttles, and a conveyor belt for carrying and returning said shuttles from said receiving means to said ejecting means.

25. In a high capacity machine for weaving having gripping shuttles, the combination of ejecting means adapted to eject said shuttles in a direction across the shed, receiving means adapted to receive said shuttles, and movable transport means located below the shed and adapted to carry and to return said shuttles from said receiving means to said ejecting means, said transport means comprising in combination means for horizontally transporting said shuttles across the loom, and means for lifting said shuttles from said means for horizontally transporting said shuttles into said ejecting means.

26. In a high capacity machine for weaving having gripping shuttles, the combination of ejecting means adapted to eject said shuttles in a direction across the shed, receiving means adapted to receive said shuttles, a conveyor belt for horizontally transporting said shuttles from below said receiving means to below said ejecting means, and elevator means for lifting said shuttles from said conveyor belt into said ejecting means.

27. In a high capacity machine for weaving, gripping shuttles, ejecting means adapted to eject said shuttles in a direction across the shed, receiving means adapted to receive said shuttles, a conveyor belt for horizontally transporting said shuttles from below said receiving means to below said ejecting means, elevator means for lifting said shuttles from said conveyor belt into said ejecting means, and shuttle release means Nov. 16, 1937.   J. F. SAMPSON   2,099,628
ADJUSTABLE PULL ROD CLAMP
Filed Dec. 7, 1936
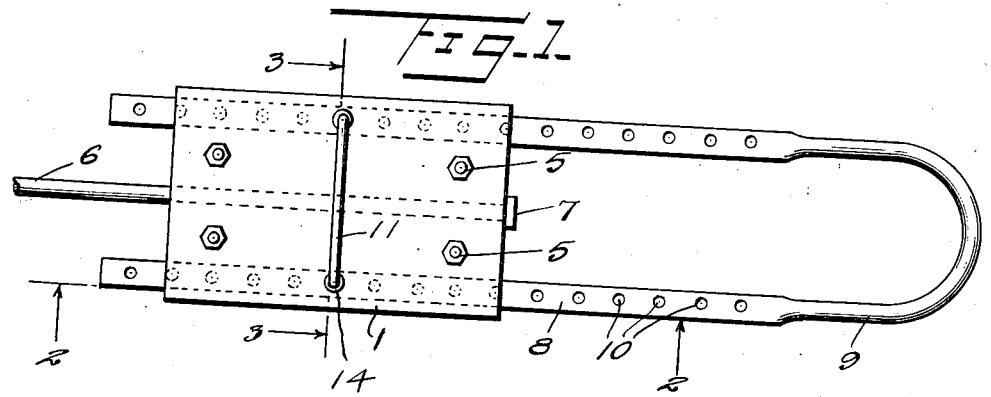
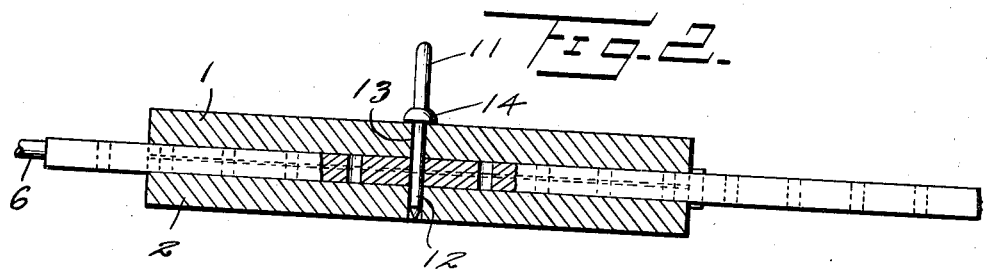
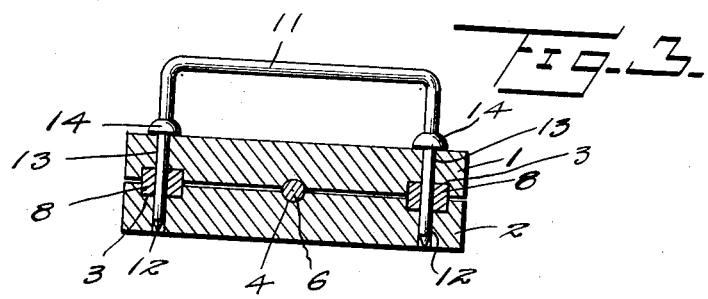
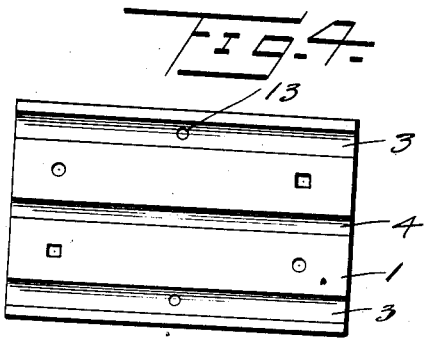
J. F. Sampson
INVENTOR
BY Victor J. Evans & Co.
ATTORNEY